UNITED STATES PATENT OFFICE.

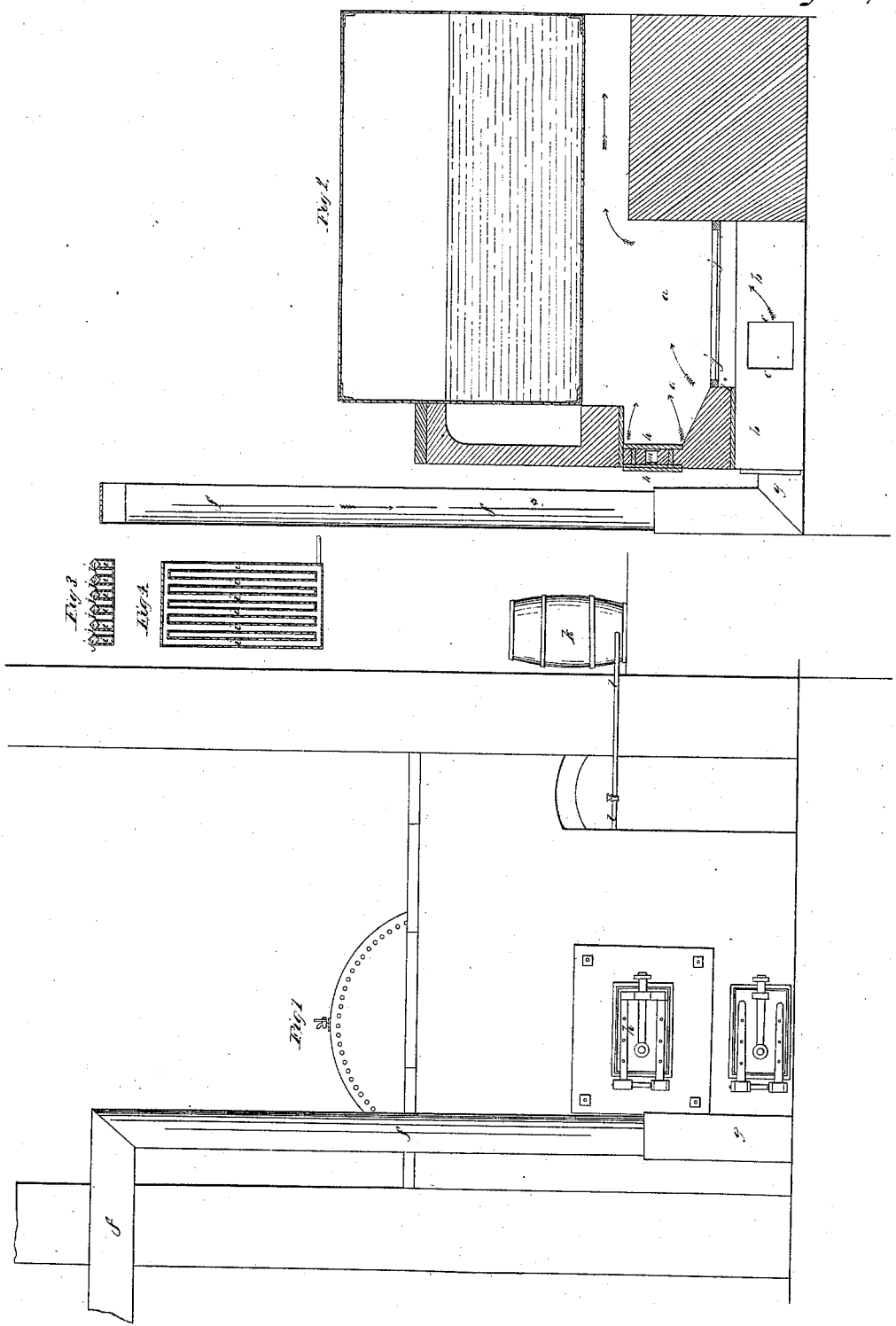

JOHN KYMER, OF CARMARTHEN COUNTY, ENGLAND.

FURNACE-GRATE BAR.

Specification of Letters Patent No. 3,671, dated July 19, 1844.

*To all whom it may concern:*

Be it known that I, JOHN KYMER, of the county of Carmarthen, South Wales, in the Kingdom of Great Britain, have made a new and useful improvement in the manner of combining and arranging the grates of furnaces, by which improvement the fire-bars are rendered more durable than in furnaces of the ordinary construction and a quantity of steam is generated, which, entering between the grate-bars along with the atmospheric air, promotes the combustion of the fuel, and that more especially when anthracite or stone coal is used; and I do hereby declare that the following is a full and exact description thereof.

In my improved furnace grates, I so arrange the fire bars as that their lower sides shall, when in use, dip into a trough, or troughs, containing water, which water is continuously supplied to said trough, or troughs, from a cistern, reservoir, or any other convenient source.

In the accompanying drawing, Figure 1, shows a front view of a steam boiler furnace, and Fig. 2, a longitudinal section thereof. Fig. 3, represents a transverse section of the fire bars, and of the water troughs, into which the lower portions of said bars are to dip. Fig. 4, is a plan of the water trough, or troughs, the furnace bars being removed therefrom.

In Figs. 1, and 2, *a, a*, is the furnace, or fire-chamber; *b*, is the ash-pit, which may be closed by a door, *c*, in order to allow of air being blown into the ash-pit by means of a rotary fan, or in any other convenient mode; such a fan may be situated at *e*, and the air enter the ash-pit at *g;* or the draft may be created by placing a rotary fan in the flue, or chimney, of the furnace, which fan may be made to withdraw, or exhaust, air from the furnace, in a manner well known.

From a rotary fan, situated at *e*, I have represented a trunk, or pipe, *f, f*, so situated as to conduct the air into the ash-pit. In my actual furnace, I have also formed a passage in the brick work which leads from the ash-pit to the space between the double doors, *h, h*, Fig. 2, the opening thereto being seen at *m;* by this means the outer door is kept cool. The manner in which the air passes over the fuel is indicated by the arrows.

In Figs. 3, and 4, *i, i, i*, are the water troughs, and *j, j, j*, are the grate bars; *k*, Fig. 1, represents a tub of water, and *l, l*, a pipe leading therefrom to the water troughs; the quantity thus supplied may be readily regulated by means of a stop cock; this supply should be such as will suffice to keep the troughs constantly filled, in order that the bars may be in contact with that fluid; provision may, of course, be made for carrying off waste water. The bars, *j, j*, I have made square, and somewhat wider, when measured diagonally, than the water troughs, so that the ashes may escape into the ash-pit clear of the troughs, the latter being separate from each other, so as to allow an open space between them, like the grate bars, but being connected together by the cross troughs at their ends.

I have preferred, in the accompanying drawings, to represent a furnace such as I have put into actual operation, but without intending thereby to limit myself to the particular manner shown of supplying air to the furnace, or water to the troughs; as my improvement in the arrangement and combination of the grate bars and the water trough is not, in any wise dependent upon such modes of supply, as these may, and will, be varied by any competent workman in such way as to adapt them to particular circumstances.

Having thus fully described the nature and object of my improvement in the manner of constructing the grates of furnaces, I do hereby declare that I do not make any claim to the causing of steam to enter the furnace in conjunction with atmospheric air, by which the combustion is to be kept up; this having been previously done by conducting waste steam through tubes arranged beneath the grate bars, such steam having been allowed to escape through lateral perforations made in said tubes for that purpose; but

What I do claim as constituting my invention, and desire to secure by Letters Patent, is—

The manner herein described of protecting the fire bars from being burnt out, and of generating steam to aid in the combustion of the fuel, by causing the grate bars to dip into troughs which are kept supplied with water, said bars and troughs being combined and arranged substantially in the manner, and for the purpose, herein set forth.

JOHN KYMER.

Witnesses:
 JNO. M'JUNLEY,
 W. BRAND.